United States Patent [19]
Suyama

[11] 3,794,291
[45] Feb. 26, 1974

[54] BALL VALVE APPARATUS

[75] Inventor: Ryoji Suyama, Yono, Japan

[73] Assignee: Kitamura Valve Mfg. Co., Ltd., Tokyo, Japan

[22] Filed: Aug. 17, 1972

[21] Appl. No.: 281,327

[30] Foreign Application Priority Data
May 18, 1972 Japan.............................. 47-48543

[52] U.S. Cl................. 251/171, 251/172, 251/174, 251/315
[51] Int. Cl................................................ F16k 5/06
[58] Field of Search............ 251/170, 171, 172, 174

[56] References Cited
UNITED STATES PATENTS

| | | | |
|---|---|---|---|
| 3,378,026 | 4/1968 | Oliver | 251/172 X |
| 2,919,886 | 1/1960 | Hurst | 251/172 |
| 2,916,254 | 12/1959 | Wendell | 251/172 |
| 3,346,234 | 10/1967 | Allen | 251/174 |
| 3,241,808 | 3/1966 | Allen | 251/172 X |
| 2,483,891 | 10/1949 | Downey | 251/174 X |

*Primary Examiner*—Harold W. Weakley
*Attorney, Agent, or Firm*—Spensley, Horn and Lubitz

[57] ABSTRACT

A ball valve apparatus having a hollow housing in which a spherical valve member is rotatably received. The housing has fluid passages in each of which is axially movably disposed a retainer sleeve having its inner end face formed therein with an annular groove into which a seal ring is fitted for sealing engagement with the valve member. The retainer sleeve has an axially inwardly and radially outwardly inclined outer peripheral surface which cooperates with an inner surface portion of the housing to define an annular space which communicates with the corresponding fluid passage and in which an O-ring is received. The O-ring is radially outwardly and axially inwardly displaceable along the inclined outer surface of the retainer sleeve by the pressure within the fluid passage whereby the O-ring is expanded to exert an increased axial inward biasing pressure force to the retainer sleeve.

3 Claims, 3 Drawing Figures

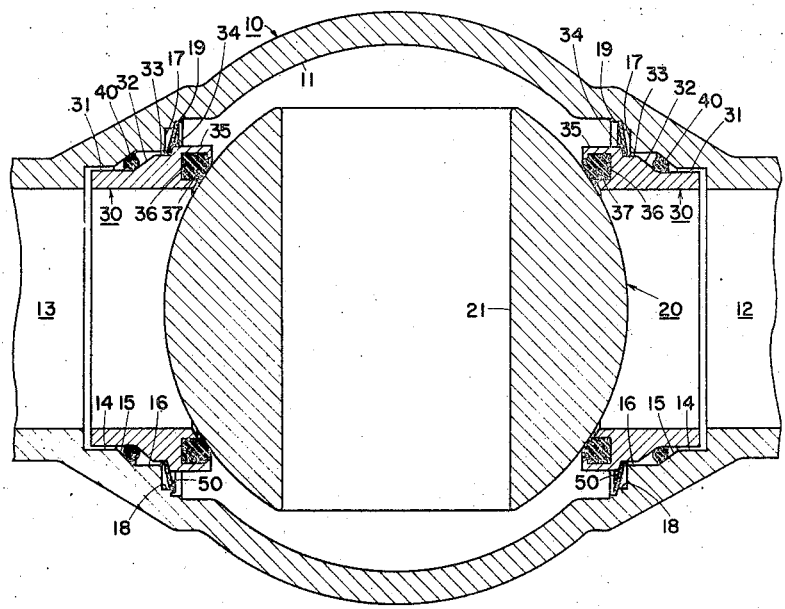

BALL VALVE APPARATUS

BACKGROUND OF THE INVENTION

1. Field of the Invention

The present invention relates to a ball valve apparatus particularly suited for controlling fluids under high pressure.

2. Prior Art

Ball valve is well-known in the art as disclosed in, for example, U.S. Pat. No. 2,796,230 to Marvin H Grove, Piedmont et al. The known valve utilizes the fluid pressure to displace a sealing ring in the axial direction thereof so that the sealing ring is urged against a spherical valve member to cooperate therewith to form a fluid tight seal against leakage.

SUMMARY OF THE INVENTION

It is an object of the present invention to provide a novel ball valve apparatus which can be readily operated and which provides an improved fluid tight seal against leakage.

It is another object of the present invention to provide a ball valve apparatus in which the increase in the fluid preasure results in the increase in the contact pressure between the sealing ring and the spherical valve member to thereto assure a fluidtight seal therebetween.

It is a further object of the present invention to provide a ball valve apparatus in which the fluid pressure is utilized to urge the sealing ring against the spherical valve member and to radially outwardly expand a resilient annular packing material and in which the axial force component of a force tending to reduce the increased diameter of the annular packing material is utilized to further urge the sealing ring against the valve member.

It is a still further object of the present invention to provide an improved ball valve apparatus in which, when the fluid pressure within the chamber housing the spherical valve member exceeds a predetermined normal pressure level, the fluid is automatically allowed to escape from the chamber into the fluid passages.

The above objects of the invention are achieved by the ball valve apparatus of the invention which comprises a valve housing having fluid passages formed therein, a spherical valve member rotatable to open and close the fluid passages, an annualar retainer member disposed within each of the fluid passages for axial movement with respect thereto, each passage and the corresponding retainer member defining a slight gap therebetween, each retainer member having a sealing means at the axial inner end thereof and a radially outwardly and axially inwardly extending inclined peripheral outer surface, the housing having a substantially cylindrical inner surface and a generally radially outwardly extending annular surface both disposed substantially in opposite relationship to the inclined outer surface of the retainer member to define an annular space therebetween, the substantially cylindrical inner surface having a diameter larger than the mean diameter at the annular contact area between the sealing means and the spherical outer surface of the valve member, and a resilient annular packing member disposed in the annular space to form a fluidtight seal between the housing and the retainer member.

The above and other objects, features and advantages of the present invention will be made more apparent by the following description of a preferred embodiment of the invention with reference to the accompanying drawings.

DESCRIPTION OF THE PRESENTLY PREFERRED EMBODIMENT

Figure 1:
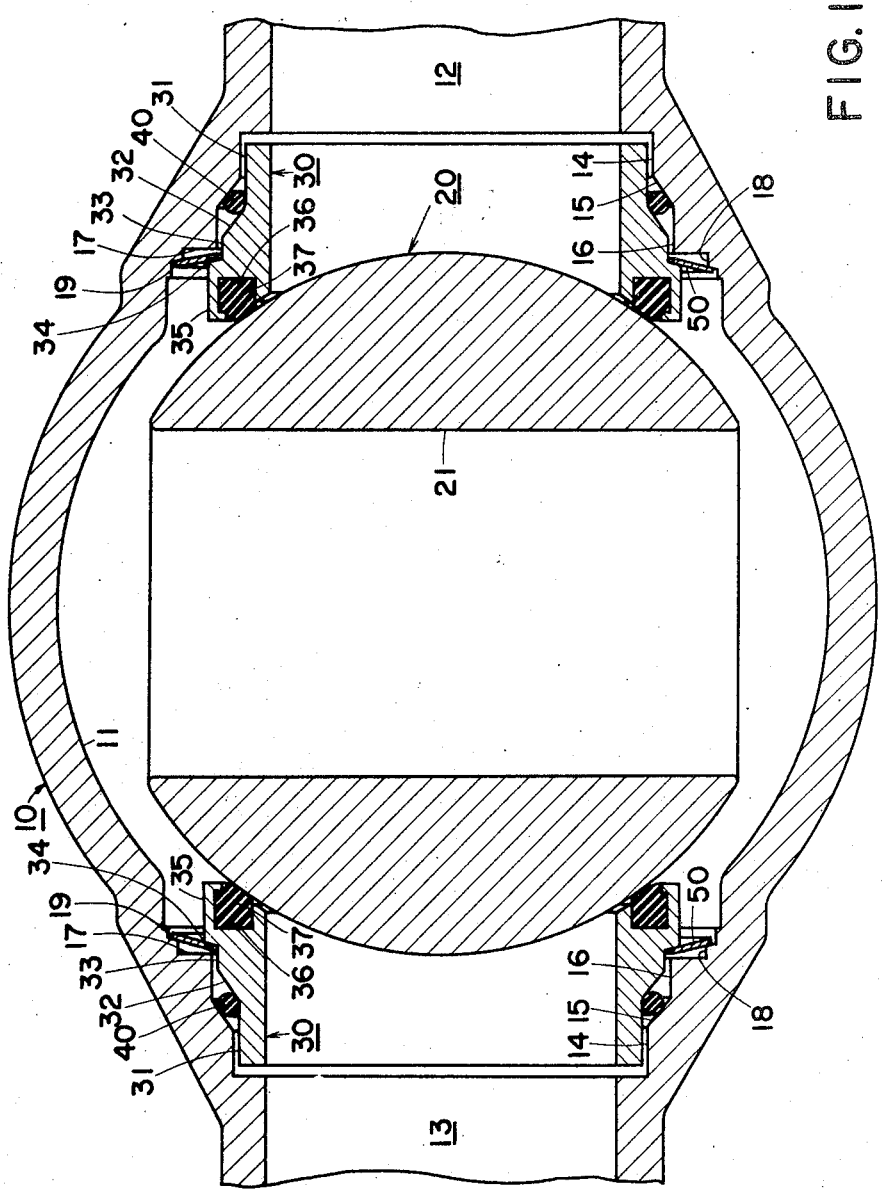
FIG. 1 is an axial sectional view of an embodiment of the ball valve apparatus according to the present invention.
Figure 2:
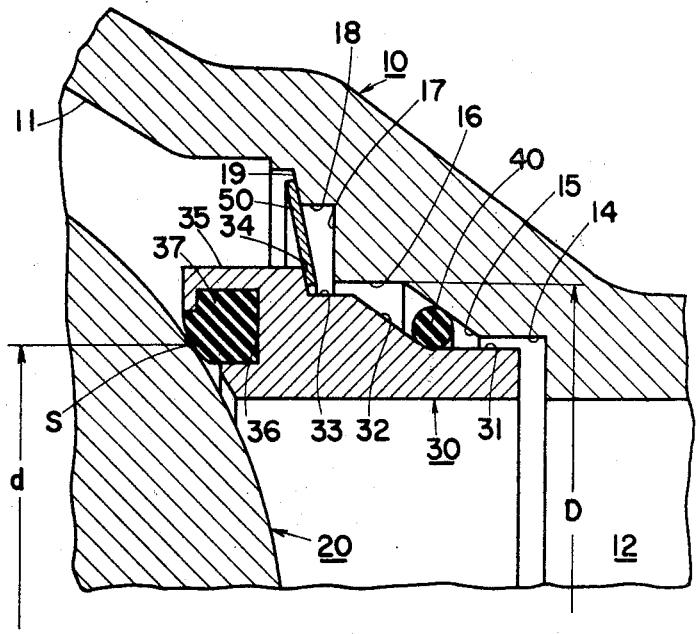
FIG. 2 is an enlarged fragmentary axial sectional view of the ball valve apparatus illustrating a retainer sleeve and related parts of a housing when the fluid passage is not at a substantial pressure level.
Figure 3:
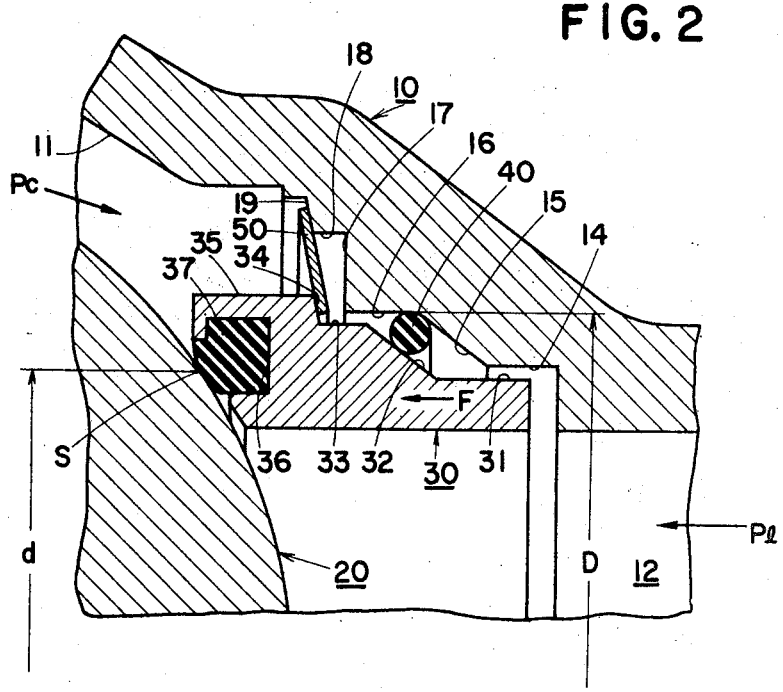
FIG. 3 is a similar view but illustrating the valve parts when the fluid passage is at a substantial pressure level.

Referring to the drawings, there is shown an embodiment of the ball valve apparatus according to the present invention. The apparatus includes a valve housing generally indicated at 10 and defining a substantially spherical chamber 11 in which a substantially spherical or ball-like valve member 20 having a through-hole 21 formed therein is received. The housing 10 is also provided therein with a pair of axially aligned fluid passages 12 and 13.

Adjacent the inner end of each of the fluid passages 12 and 13, there is provided within the housing 10 a first substantially cylindrical inner surface 14 radially outwardly offset from the inner surface of each of the passages 12 and 13. A first radially outwardly and axially inwardly extending inclined annular surface 15 extends from the inner end of each of the first cylindrical inner surfaces 14. From each of the first inclined annular surfaces 15 extends a second substantially cylindrical inner surface 16. From the axial inner end of each of the second cylindrical inner surfaces 16 extends radially outwardly a first annular surface or shoulder 17 which is connected at the radial outer end to a third substantially cylindrical surface 18 which in turn is connected at the axial inner end to a second annular surface or shoulder 19 which is connected to the substantially spherical inner surface of the chamber 11. Thus, it will be appreciated that the surfaces 14, 15, 16, 17, 18 and 19 cooperate together to form a boundary which connects the spherical inner surface of the chamber 11 with each of the fluid passages 12 and 13.

Inwardly of the boundary between the chamber 11 and each of the fluid passages 12 and 13 is disposed a sleeve-like retainer 30 having formed therein an axial passage of an inner diameter substantially equal to that of each of the fluid passages 12 and 13. Each retainer sleeve 30 is provided, adjacent the axial end thereof, with a first substantially cylindrical outer surface 31 which cooperates with the first cylindrical inner surface 14 of the housing 10 to form a slight annular gap therebetween.

From the axial inner end of the first cylindrical outer surface 31 extends radially outwardly and axially inwardly an inclined outer surface 32 which is substantially parallel with but axially inwardly spaced a distance from the inclined inner surface 15 of the housing 10. From the axial inner end of the inclined outer surface 32 extends axially inwardly a second substantially cylindrical outer surface 33 which is connected at the axial inner end to a radially outwardly extending annular surface or shoulder 34 which in turn is connected at the radial outer end to a third substantially cylindrical outer surface 35.

In the illustrated embodiment of the invention, the retainer sleeve 30 advantageously has its axial inner end face formed therein with an annular groove 36 in which a sealing ring 37 of an appropriate hard material such as wear-resistant metal is disposed in sealing engagement with the spherical outer surface of the valve member 20. However, it will be apparent to anyone in the art that the sealing ring 37 may be integral with the retainer sleeve 30.

The arrangement is such that the mean diameter $d$ at the annular area S of contact between each of the sealing rings 37 and the spherical outer surface of the valve member 20 is smaller than the inner diameter D of the second cylindrical inner surface 16 of the housing 10.

Within the annular space defined between the inclined inner surface 15 of the housing 10 and the inclined outer surface 32 of the retainer sleeve 30 is disposed an O-ring 40 which, in its free state, has a cross-section of a diameter larger than the distance between the inclined surfaces 15 and 32. The O-ring may have a reincorcing spring embedded therein.

An annular diaphragm spring 50 is disposed between the housing 10 and the retainer sleeve 30 in such a manner that the outer peripheral edge portion of the spring 50 is engaged with the second shoulder 19 of the housing 10 while the inner peripheral edge portion of the spring 50 is engaged with the shoulder 34 of the retainer sleeve 30 so that the latter is axially inwardly resiliently urged against spherical outer surface of the valve member 20.

With the afore-described construction, when the ball valve apparatus of the present invention is not subjected to substantial fluid pressure of the fluid within the chamber 11 and the passages 12 and 13, the O-ring 40 is in contact, at a slight pressure force, with the inclined inner surface 15 of the housing 10 and with the inclined outer surface 32 and the substantially cylindrical outer surface 31 of the retainer sleeve 30. In this instance, the valve member 20 is held in position by the sealing rings 37 under the pressure of the spring 50 only. The pressure which is exerted upon the valve member 20 from the spring 50 is relatively small. For the reason, a small force will be sufficient to rotate the spherical valve member 20 with respect to the housing 10 for bringing the through-hole 21 into axial alignment with the passages 12 and 13.

When the fluid pressure with either the passage 12 or the passage 13 exceeds the fluid pressure within the chamber 11, the corresponding sealing ring 37 will be urged against the spherical outer surface of the valve member 20 at a pressure force which will be represented by the following equation:

$$F = (\pi/4)(D^2 - d^2)(P_t - P_c) + + \alpha$$

wherein F is the pressure force of the sealing ring 37 acting on the valve member 20; $P_t$ is the fluid pressure within one of the passages 12 and 13; $P_c$ is the fluid pressure within the chamber 11; $\alpha$ is the axial inward biasing force of the spring 50. It will therefore be appreciated that the larger the fluid pressure ($P_t$) within the passage 12 or the passage 13 is, the larger the pressure force of the sealing ring 37 against the valve member 20 is, to thereby assure a fluidtight seal between the valve member 20 and the sealing ring 37.

As the fluid pressure ($p_t$) is increased, an axial inward pressure force is exerted to the O-ring 40 so that the latter is axially displaced and/or deformed with a result that the point of contact between the O-ring 40 and the inclined outer surface 32 of the retainer sleeve 30 is gradually radially outwardly displaced, i.e., the O-ring is radially outwardly expanded to have an increased diameter. Internally a force is created in the O-ring which desires to return the O-ring to its original diameter. This internal force creates an external force which includes an axial force component which is operative to further urge the sealing ring 37 against the valve member 20. Thus, when the fluid pressure ($P_t$) is increased, an axial biasing force due to the fluid pressure ($P_t$) and, in addition, an axial biasing force due to the axial displacement of the O-ring 40 are exerted to the retainer sleeve 30 so that the latter ias advantageously and effectively urged into sealing engagement with the valve member 20.

If the fluid pressure (Pc) within the chamber 11 should become larger than the fluid pressure ($P_t$) due to an abnormal situation, the force F represented by the above equation is of a negative value. If the absolute value of the negative force F exceeds the value $\alpha$, the sealing ring 37 will be moved away off the spherical surface of the valve member 20 to cause the fluid to escape from the chamber 11 for thereby providing the valve apparatus of the invention with a relief feature. This provides an advantage that no extra relief valve is required.

The present invention is not limited to the aforedescribed and illustrated embodiment of the invention because various modifications and changes may be made to the described and illustrated embodiment without departing from the spirit of the invention. For example, the radially outwardly and axially inwardly extending inclined surface 15 of the housing 10 may alternatively be a mere radially outwardly extending annular surface. Also, the O-ring 40 may be replaced by any conventional resilient annular packing or sealing material. Moreover, the retainer sleeve 30 and the related portions may have configurations and arrangements other than those afore-described and illustrated.

I claim:
1. A ball valve apparatus comprising:
   a. a valve housing having fluid passages formed thereon, said housing having a substantially spherical chamber and defining a generally radially outwardly and axially inwardly inclined annular inner surface extending to each of said fluid passages;
   b. a rotatable spherical valve member for opening and closing said fluid passages;
   c. an annular retainer member disposed within each of said fluid passages for axial movement with respect thereto; each of said fluid passages and said corresponding retainer members defining a slight gap therebetween, said retainer member having a radially outwardly and axially inwardly extending inclined peripheral outer surface disposed so as to define an annular space between said retaining member and said inner surface of said housing, and a sealing means at the axial inner end thereof;
   d. a resilient annular packing member disposed in said annular space between said outer peripheral surface of said retainer member and said inner sur- face of said housing may be displaced by pressure changes in said fluid passage such that the diameter of said resilient member is increased thereby, creating a force which urges said sealing means of said retainer member against said valve;

wherein said radially outwardly and axially inwardly extending inclined annular inner surface of said housing is substantially parallel to said radially outwardly and axially inwardly extending inclined peripheral outer surface of said retainer member.

2. The apparatus of claim 1 wherein said radially outwardly and axially inwardly extending inclined peripheral outer surface of said retainer member has at least three annular shoulders, and said radially outwardly and axially inwardly extending annular inner surface of said valve housing has at least three annular shoulders disposed in relation to said annular shoulders of said retainer member such that said resilient annular member, when disposed between said shoulders, will have a limited range within which said diameter may be expanded.

3. The apparatus of claim 1 wherein an annular spring for resiliently axially inwardly biasing said sealing means of said retainer member against said valve member is disposed so as to engage said radially outwardly and axially inwardly inclined annular surface of said inner surface of said housing with said radially outwardly and axially inwardly inclined peripheral outer surface of said retainer member.

* * * * *